(12) United States Patent
Kasai

(10) Patent No.: US 7,303,614 B2
(45) Date of Patent: Dec. 4, 2007

(54) INK COMPOSITION AND INKJET RECORDING METHOD

(75) Inventor: Seishi Kasai, Shizuoka (JP)

(73) Assignee: FUJIFILM Corporation, Tokyo (JP)

(*) Notice: Subject to any disclaimer, the term of this patent is extended or adjusted under 35 U.S.C. 154(b) by 95 days.

(21) Appl. No.: 11/002,267

(22) Filed: Dec. 3, 2004

(65) Prior Publication Data

US 2005/0150424 A1   Jul. 14, 2005

(30) Foreign Application Priority Data

Dec. 5, 2003   (JP) ............... P.2003-407049

(51) Int. Cl.
*C09D 11/00* (2006.01)
*G01D 11/00* (2006.01)

(52) U.S. Cl. ............... 106/31.33; 106/31.65; 347/100

(58) Field of Classification Search ........... 106/31.33, 106/31.65; 347/100
See application file for complete search history.

(56) References Cited

U.S. PATENT DOCUMENTS

| 5,100,471 | A | * | 3/1992 | Winnik et al. ............... 523/216 |
| 5,952,048 | A | | 9/1999 | Tsubuko et al. |
| 6,158,844 | A | | 12/2000 | Murakami et al. |
| 2003/0032700 | A1 | * | 2/2003 | Morrison et al. ........... 523/160 |
| 2004/0001134 | A1 | * | 1/2004 | Nakazawa et al. .......... 347/101 |
| 2004/0183860 | A1 | * | 9/2004 | Furukawa .................... 347/55 |
| 2004/0214920 | A1 | * | 10/2004 | Aoshima .................... 523/160 |

FOREIGN PATENT DOCUMENTS

| JP | 8-291267 A | 11/1996 |
| JP | 3315334 B2 | 6/2002 |

* cited by examiner

*Primary Examiner*—J. A. Lorengo
*Assistant Examiner*—Veronica Faison-Gee

(57) ABSTRACT

An ink composition comprising a dispersion medium and a charged particle, wherein the charged particle comprises a colorant, a compound having pKb of 16 or less in water and containing a proton-acceptive neutral functional group, and a charge controlling agent having pKa of 16 or less in water and containing a proton-donative group.

7 Claims, 3 Drawing Sheets

INK COMPOSITION AND INKJET RECORDING METHOD

FIELD OF THE INVENTION

The present invention relates to an ink composition and an inkjet recording method, and more particularly, it relates to an ink composition that is capable of providing an image of good quality free from blur because charge generating efficiency of ink particle and charge stability of ink particle with the lapse of time are improved and electrophoretic speed of ink particle is so high that concentration of ink particles sufficiently occurs at an ejection part of an inkjet recording device, and an inkjet recording method.

BACKGROUND OF THE INVENTION

As an image recording method of forming an image on a recording medium, for example, paper, based on image data signals, an electrophotographic system, a sublimation or melting thermal transfer system and an inkjet system have been hitherto known. Among these systems, the electrophotographic system is a complex system and an apparatus therefor is expensive because it requires such a process that an electrostatic latent image is formed on a photoreceptor drum through charge and exposure. The thermal transfer system involves a high running cost and a problem of formation of waste materials due to the use of an ink ribbon, although an apparatus therefor itself is inexpensive in comparison with the electrophotographic system. In the inkjet system, on the other hand, image formation is carried out with an inexpensive apparatus in such a manner that an ink is directly ejected to only a necessary image area on a recording medium, and thus the ink can be used efficiently to reduce the running cost. Further, the inkjet system causes less noise, and thus it is excellent as the image recording method.

The inkjet recording system includes, for example, a system of flying ink droplets by pressure of vapor generated by heat from a heat generator, a system of flying ink droplets by mechanical pressure pulses generated by a piezoelectric element, and a system of flying ink droplets containing charged particles by utilizing an electrostatic field (refer to Patent Documents 1 and 2). The system of flying ink droplets with vapor or mechanical pressure cannot control a flying direction of ink droplet, and sometimes a case may occur where ink droplet is difficult to be accurately reached to the desired position on a printing medium due to distortion of ink nozzle and air convection.

On the contrary, the system utilizing an electrostatic field controls the flying direction of ink droplet with the electrostatic field to enable ink droplet to be accurately reached the desired position, and thus it is advantageous in that an imaged material (printed material) with high image quality can be produced.

As an ink composition for use in the inkjet recording system utilizing an electrostatic field, an ink composition comprising a dispersion medium and charged particles containing at least a colorant is ordinarily employed (refer to Patent Documents 3 and 4). The ink composition containing a colorant can form inks of four colors, i.e., yellow, magenta, cyan and black, by changing the colorant, and can also form special color inks of gold and silver. Accordingly, the ink composition is useful for producing a color imaged material (printed material). In order to produce stably color imaged materials (printed materials) while maintaining high speed and high image quality, however, it is necessary that electrophoretic speed of ink particles is so high that concentration of ink particles sufficiently occurs at an ejection part of an inkjet recording device. For such a purpose, it is confirmed that ink particles must be provided with a sufficient amount of charge. However, liquid developers comprising toner particles having a particle size of 0.5 μm or less ordinarily used in the electrophotographic system are not suitable for the electrostatic inkjet system. Although it is possible to increase the amount of charge of ink particles by increasing the particle size, a satisfactory level for using in the electrostatic inkjet system cannot be achieved at present. Further, when the particle size increases, the amount of charge of ink particles is apt to change with the lapse of time. Thus, it is difficult to obtain an ink composition satisfactorily and stably used in the electrostatic inkjet system.

Patent Document 1: Japanese Patent 3,315,334
Patent Document 2: U.S. Pat. No. 6,158,844
Patent Document 3: JP-A-8-291267 (the term "JP-A" as used herein means an "unexamined published Japanese patent application")

SUMMARY OF THE INVENTION

The present invention has been made taking the problems involved in the above-described prior art into consideration, and an object of the invention is to provide an ink composition that is capable of providing an image of good quality free from blur because charge generating efficiency of ink particle and charge stability of ink particle with the lapse of time are improved and electrophoretic speed of ink particle is so high that concentration of ink particles sufficiently occurs at an ejection part of an inkjet recording device, and an inkjet recording method.

The present invention includes the following constitutions.

(1) An ink composition comprising a dispersion medium and a charged particle, wherein the charged particle comprises a colorant, a compound having pKb of 16 or less in water and containing a proton-acceptive neutral functional group, and a charge controlling agent having pKa of 16 or less in water and containing a proton-donative group.

(2) The ink composition as described in item (1) wherein the proton-acceptive neutral functional group is a functional group containing one or more atoms selected from a nitrogen atom, an oxygen atom, a sulfur atom and a phosphorus atom.

(3) An inkjet recording method-comprising a step of flying an ink composition as ink droplets by utilizing an electrostatic field, wherein the ink composition comprises a dispersion medium and a charged particle comprising a colorant, a compound having pKb of 16 or less in water and containing a proton-acceptive neutral functional group, and a charge controlling agent having pKa of 16 or less in water and containing a proton-donative group.

The invention also preferably includes the following embodiments.

(4) The ink composition as described in item (1), wherein the charged particles contain a coating agent.

(5) The ink composition as described in item (4), wherein the compound containing a proton-acceptive neutral functional group is used as a constituting component of the coating agent.

(6) The ink composition as described in item (1), wherein an amount of the proton-acceptive neutral functional group is from 0.01 to 40% by weight based on the charged particles.

(7) The ink composition as described in item (1), wherein the charge controlling agent having pKa of 16 or less in water and containing a proton-donative group has a carboxy group, a hydroxy group, a phosphono group, a sulfo group, a thiol group, an imido group or a sulfonamido group.

Figure 1:
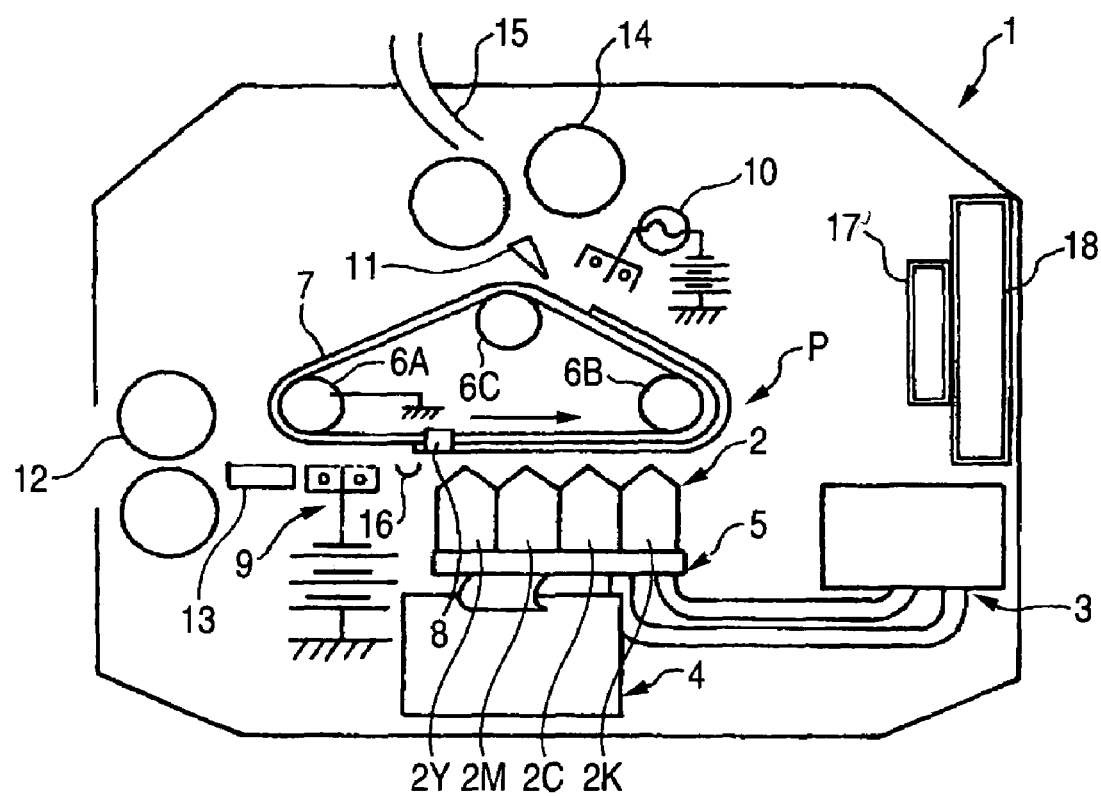
FIG. 1 is an overall construction view schematically showing an example of an inkjet recording apparatus used in the invention.

G: Ink droplet
P: Recording medium
Q: Ink flow
R: Charged particle
1: Inkjet recording apparatus
2, 2Y, 2M, 2C, 2K: Ejection head
3: Ink circulation system
4: Head driver
5: Position controlling means
6A, 6B, 6C: Roller
7: Conveying belt
8: Conveying belt position detecting means
9: Electrostatic adsorption means
10: Static eliminating means
11: Mechanical means
12: Feed roller
13: Guide
14: Image fixing means
15: Guide
16: Recording medium position detecting means
17: Exhaust fan
18: Solvent vapor absorbent
38: Ink guide
40: Supporting bar
42: Ink meniscus
44: Insulating layer
46: First ejection electrode
48: Insulating layer
50: Guard electrode
52: Insulating layer
56: Second ejection electrode
58: Insulating layer
62: Floating electroconductive plate
64: Coating film
66: Insulating member
70: Inkjet head
72: Ink flow channel
74: Substrate
75, 75A, 75B: Opening
76, 76A, 76B: Ejection part
78: Ink guide part

DETAILED DESCRIPTION OF THE INVENTION

According to the present invention, an ink composition that is capable of providing an image of good quality free from blur because charge generating efficiency of ink particle and charge stability of ink particle with the lapse of time are improved and electrophoretic speed of ink particle is so high that concentration of ink particles sufficiently occurs at an ejection part of an inkjet recording device, by incorporating at least one kind of a compound having pKb of 16 or less in water and containing a proton-acceptive neutral functional group and at least one kind of a charge controlling agent having pKa of 16 or less in water and containing a proton-donative group into a charged particle (ink particle), and an inkjet recording method using the ink composition are provided.

The ink composition according to the invention comprises a dispersion medium and a charged particle, which comprises a colorant, a compound having pKb of 16 or less in water and containing a proton-acceptive neutral functional group, and a charge controlling agent having pKa of 16 or less in water and containing a proton-donative group.

The constituting components of the ink composition according to the invention will be described below.

<Compound Having pKb of 16 or Less in Water and Containing a Proton-acceptive Neutral Functional Group>

As the compound (hereinafter also referred to as a "proton-acceptive neutral functional group-containing compound") having pKb of 16 or less in water (the term "in water" used herein means "in water at temperature of 25° C.") and containing a proton-acceptive neutral functional group, for example, compounds wherein the neutral functional group is a functional group containing a nitrogen atom, an oxygen atom, a sulfur atom and/or a phosphorus atom are exemplified. Specific examples of the compound include a primary, secondary or tertiary aliphatic amine (e.g., methylamine, ethylamine, propylamine, n-butylamine, n-hexylamine, 2-ethylhexylamine, dimethylamine, diethylamine, di-n-butylamine, di-n-hexylamine, methylethylamine, ethyl-n-butylamine, triethylamine, tri-n-butylamine, tri-n-hexylamine, dimethylethylamine or diethyl-n-butylamine), a primary, secondary or tertiary aromatic amine (e.g. phenylamine, naphthylamine, p-bromophenylamine, p-methoxyphenylamine, m-bromophenylamine, methylphenylamine, ethylphenylamine, methylnaphthylamine, n-butylphenylamine, 2-ethylhexylphenylamine, diphenylamine, dimethylphenylamine, diethylphenylamine, triphenylamine, methyldiphenylamine or n-butyldiphenylamine), a hydrazine compound (e.g., hydrazine, dimethylhydrazine or diethylhydrazine), a nitrogen atom-containing heterocyclic compound (e.g., pyridine, imidazole, oxazoline or triazole), a sulfide compound (e.g., dimethylsulfide, diethylsulfide, di-n-butylsulfide, di-n-hexylsulfide, diphenylsulfide or methylphenylsilfide).

Of these compounds, the primary, secondary or tertiary aliphatic amine, primary, secondary or tertiary aromatic amine and nitrogen atom-containing heterocyclic compound are preferred, and the primary, secondary or tertiary aliphatic amine and nitrogen atom-containing heterocyclic compound are more preferred.

<Polymer Containing a Component Corresponding to the Compound Having pKb of 16 or Less in Water and Containing a Proton-acceptive Neutral Functional Group>

The compound having pKb of 16 or less in water and containing a proton-acceptive neutral functional group that can be used in the invention may include a polymer (hereinafter also referred to as a "proton-acceptive neutral functional group-containing polymer") containing a component corresponding to the compound having pKb of 16 or less in water and containing a proton-acceptive neutral functional group, in addition to the above-described low molecular compound. As a component constituting the main chain of such a polymer, a known monomer, for example, an acrylate, a methacrylate, an acrylamide, a methacrylamide, a vinyl ester, a styrene, acrylic acid, methacrylic acid, acrylonitrile, maleic anhydride or maleinimide, an alkylene chain or an phenylene chain are also exemplified.

Specific examples of the acrylate include methyl acrylate, ethyl acrylate, (n- or iso-)propyl acrylate, (n-, iso-, sec- or tert-)butyl acrylate, amyl acrylate, 2-ethylhexyl acrylate, dodecyl acrylate, chloroethyl acrylate, 2-hydroxyethyl acrylate, 2-hydroxypropyl acrylate, 2-hydroxypentyl acrylate, cyclohexyl acrylate, allyl acrylate, trimethylolpropane monoacrylate, pentaerythritolmonoacrylate, benzyl acrylate, methoxybenzyl acrylate, chlorobenzyl acrylate, hydroxybenzyl acrylate, hydroxyphenethyl acrylate, dihydroxyphenethyl acrylate, furfuryl acrylate, tertahydrofurfuryl acrylate, phenyl acrylate, hydroxyphenyl acrylate, chlorophenyl acrylate, sulfamoylphenyl acrylate and 2-(hydroxyphenylcarbonyloxy)ethyl acrylate.

Specific examples of the methacrylate include methyl methacrylate, ethyl methacrylate, (n- or iso-)propyl methacrylate, (n-, iso-, sec- or tert-)butyl methacrylate, amyl methacrylate, 2-ethylhexyl methacrylate, dodecyl methacrylate, chloroethyl methacrylate, 2-hydroxyethyl methacrylate, 2-hydroxypropyl methacrylate, 2-hydroxypentyl methacrylate, cyclohexyl methacrylate, allyl methacrylate, trimethylolpropane monomethacrylate, pentaerythritol monomethacrylate, benzyl methacrylate, methoxybenzyl methacrylate, chlorobenzyl methacrylate, hydroxybenzyl methacrylate, hydroxyphenethyl methacrylate, dihydroxyphenethyl methacrylate, furfuryl methacrylate, tertahydrofurfuryl methacrylate, phenyl methacrylate, hydroxyphenyl methacrylate, chlorophenyl methacrylate, sulfamoylphenyl methacrylate and 2-(hydroxyphenylcarbonyloxy)ethyl methacrylate.

Specific examples of the acrylamide include acrylamide, N-methylacrylamide, N-ethylacrylamide, N-propylacrylamide, N-butylacrylamide, N-benzylacrylamide, N-hydroxyethylacrylamide, N-phenylacrylamide, N-tolylacrylamide, N-(hydroxyphenyl)acrylamide, N-(sulfamaylphenyl)acrylamide, N-(phenylsulfonyl)acrylamide, N-(tolylsulfonyl)acrylamide, N,N-dimethylacrylamide, N-methyl-N-phenylacrylamide and N-hydroxyethyl-N-methylacrylamide.

Specific examples of the methacrylamide include methacrylamide, N-methylmethacrylamide, N-ethylmethacrylamide, N-propylmethacrylamide, N-butylmethacrylamide, N-benzylmethacrylamide, N-hydroxyethylmethacrylamide, N-phenylmethacrylamide, N-tolylmethacrylamide, N-(hydroxyphenyl)methacrylamide, N-(sulfamoylphenyl)methacrylamide, N-(phenylsulfonyl)methacrylamide, N-(tolylsulfonyl)methacrylamide, N,N-dimethylmethacrylamide, N-methyl-N-phenylmethacrylamide and N-hydroxyethyl-N-methylmethacrylamide.

Specific examples of the vinyl ester include vinyl acetate, vinyl butyrate and vinyl benzoate.

Specific examples of the styrene include styrene, methylstyrene, dimethylstyrene, trimethylstyrene, ethylstyrene, propylstyrene, cyclohexylstyrene, chloromethylstyrene, trifluoromethylstyrene, ethoxymethylstyrene, acetoxymethylstyrene, methoxystyrene, dimethoxystyrene, chlorostyrene dichlorostyrene, bromostyrene, iodostyrene, fluorostyrene and carboxystyrene.

In addition, commercially available proton-acceptive neutral functional group-containing polymers and polymers obtained by introducing a proton-acceptive neutral functional group into commercially available polymers can be used without any particular limitation.

A weight average molecular weight (Mw) of the proton-acceptive neutral functional group-containing polymer is ordinarily in a range of from 3,000 to 200,000, preferably in a range of from 4,000 to 150,000, and more preferably in a range of from 5,000 to 120,000.

<Content of the Proton-acceptive Neutral Functional Group>

A content of the proton-acceptive neutral functional group is preferably from 0.01 to 40% by weight, more preferably from 0.02 to 35% by weight, and still more preferably from 0.03 to 30% by weight, based on the total amount of the charged particles. A content of the compound or monomer unit containing the proton-acceptive neutral functional group is preferably from 0.1 to 50% by weight, more preferably from 0.5 to 40% by weight, and still more preferably from 1 to 35% by weight, based on the total amount of the charged particles.

The proton-acceptive neutral functional group-containing polymer may be used as one of constituting components of the coating agent.

With respect to the compound having pKb of 16 or less in water and containing a proton-acceptive neutral functional group, the pKb thereof is preferably from −5 to 16, and more preferably from −2 to 12.

<Charge Controlling Agent Having pKa of 16 or Less in Water and Containing a Proton-donative Group>

As the charge controlling agent having pKa of 16 or less in water and containing a proton-donative group, compounds soluble in a dispersion medium and having a functional group, for example, a carboxy group, a hydroxy group, a phosphono group, a sulfo group, a thiol group, an imido group or a sulfonamido group are exemplified. The charge controlling agent includes polymers having pKa of 16 or less in water and containing a proton-donative group. Specifically, polymers soluble in a dispersion medium and comprising a functional group, for example, a carboxy group, a hydroxy group, a phosphono group, a sulfo group, a thiol group, an imido group or a sulfonamido group, introduced into polymers comprising known monomer, for example, an acrylate, a methacrylate, an acrylamide, a methacrylamide, a vinyl ester, a styrene, acrylic acid, methacrylic acid, acrylonitrile, maleic anhydride or maleinimide are preferred. As to the functional group, a carboxy group, a hydroxy group, a phosphono group, a sulfo group, a thiol group, an imido group and a sulfonamido group are preferred, and a carboxy group, a phosphono group, a sulfo group or a sulfonamido group are particularly preferred. A known charge controlling agent can be appropriately used together with the charge controlling agent having pKa of 16 or less in water and containing a proton-donative group. In such a case, however, the amount of known charge controlling agent is from 5 to 50% by weight based on the total amount of the charge controlling agents. The charge controlling agent ordinarily adsorbs to the particle.

The charge to be applied to the ink particle may be positive charge or negative charge. The content of the charge controlling agent in the ink composition is preferably in a rage of from 0.0001 to 10% by weight. The electric conductivity of the ink composition according to the invention is preferably in a range of from 10 to 300 nS/m. The electric conductivity of the charged particles is preferably 50% or more of the electric conductivity of the ink composition. These conditions can be easily adjusted by varying the amount of charge controlling agent.

With respect to the charge controlling agent having pKa of 16 or less in water and containing a proton-donative group, the pKa thereof is preferably from −5 to 16, and more preferably from −2 to 12.

<Dispersion Medium>

The dispersion medium for use in the ink composition according to the invention is preferably a dielectric liquid having a high electric resistance, specifically $10^{10}$ ωcm or more. A dispersion medium having a low electric resistance is not suitable for the invention since such a dispersion medium causes electric conduction between recording electrodes adjacent to each other. The dielectric liquid preferably has a specific dielectric constant of 5 or less, more preferably 4 or less, and still more preferably 3.5 or less. To control the specific dielectric constant of dielectric liquid in such a range is preferred since an electric filed for the ejection is efficiently applied to the charged particles in the dielectric liquid.

Examples of the dispersion medium used in the invention include a straight chain or branched aliphatic hydrocarbon, an alicyclic hydrocarbon, an aromatic hydrocarbon, halogen-substituted products of these hydrocarbons, and silicone oil. Specific examples thereof include hexane, heptane, octane, isooctane, decane, isodecane, decalin, nonane, dodecane, isododecane, cyclohexane, cyclooctane, cyclodecane, toluene, xylene, mesitylene, Isopar C, Isopar E, Isopar G, Isopar H, Isopar L and Isopar M ("Isopar" is a brand name of Exxon Corp.), Shellsol 70 and Shellsol 71 ("Shellsol" is a brand name of Shell Oil Co.), Amsco OMS and Amsco 460 solvent ("Amsco" is a brand name of American Mineral Spirits Corp.), and KF-96L (brand name of Shin-Etsu Silicone Co., Ltd.), which may be used individually or as a mixture. The content of the dispersion medium in the ink composition is preferably in a range of from 20 to 99% by weight. The particles containing a colorant can be well dispersed in the dispersion medium with the content of the dispersion medium of 20% by weight or more, and the content of a colorant is sufficient with the content of the dispersion medium of 99% by weight or less.

<Colorant>

Known dyes and pigments can be used as the colorant for use in the ink composition according to the invention, and are appropriately selected depending on use and purpose. For instance, from the standpoint of color tone of a recorded image material (printed material), a pigment is preferably used (as described, for example, in "Ganryo Bunsan Anteika to Hyomen Shori Gijutu·Hyoka" (Pigment Dispersion Stabilization and Surface Treatment Technique and Evaluation), First Edition, published by Gijutsu Joho Kyokai Co., Ltd. (Dec. 25, 2001), which is hereinafter sometimes referred to as Non-patent Document 1). Inks of four colors, i.e., yellow, magenta, cyan and black, can be prepared by changing the colorant. In particular, pigments that are used in offset printing inks or proofs are preferably used, because color tones similar to offset printed materials can be obtained.

Examples of the pigment for a yellow ink include a monoazo pigment, for example, C.I. Pigment Yellow 1 or C.I. Pigment Yellow 74, a disazo pigment, for example, C.I. Pigment Yellow 12 or C.I. Pigment Yellow 17, a non-benzidine azo pigment, for example, C.I. Pigment Yellow 180, an azo lake pigment, for example, C.I. Pigment Yellow 100, a condensed azo pigment, for example, C.I. Pigment Yellow 95, an acidic dye lake pigment, for example, C.I. Pigment Yellow 15, a basic dye lake pigment, for example, C.I. Pigment Yellow 18, an anthraquinone pigment, for example, Flavanthrone Yellow, an isoindolinone pigment, for example, Isoindolinone Yellow 3RLT, a quinophthalone pigment, for example, Quinophthalone Yellow, an isoindoline pigment, for example, Isoindoline Yellow, a nitroso pigment, for example, C.I. Pigment Yellow 153, a metallic complex azomethine pigment, for example C.I. Pigment Yellow 117, and an isoindolinone pigment, for example, C.I. Pigment Yellow 139.

Examples of the pigment for a magenta ink include a monoazo pigment, for example, C.I. Pigment Red 3, a disazo pigment, for example, C.I. Pigment Red 38, an azo lake pigment, for example, C.I. Pigment Red 53:1 or C.I. Pigment Red 57:1, a condensed azo pigment, for example, C.I. Pigment Red 144, an acidic dye lake pigment, for example, C.I. Pigment Red 174, a basic dye lake pigment, for example, C.I. Pigment Red 81, an anthraquinone pigment, for example, C.I. Pigment Red 177, a thioindigo pigment, for example, C.I. Pigment Red 88, a perynone pigment, for example, C.I. Pigment Red 194, a perylene pigment, for example, C.I. Pigment Red 149, a quinacridone pigment, for example, C.I. Pigment Red 122, an isoindolinone pigment, for example, C.I. Pigment Red 180, and an alizarin lake pigment, for example, C.I. Pigment Red 83.

Examples of the pigment for a cyan ink include a disazo pigment, for example, C.I. Pigment Blue 25, a phthalocyanine pigment, for example, C.I. Pigment Blue 15, an acidic dye lake pigment, for example, C.I. Pigment Blue 24, a basic dye lake pigment, for example, C.I. Pigment Blue 1, an anthraquinone pigment, for example, C.I. Pigment Blue 60, and an alkali blue pigment, for example, C.I. Pigment Blue 18.

Examples of the pigment for a black ink include an organic pigment, for example, an aniline black pigment, an iron oxide pigment, and a carbon black pigment, for example, furnace black, lamp black, acetylene black and channel black.

A processed pigment represented by a Microlith pigment, for example, Microlith-A, -K or -T, can also be preferably used. Specific examples thereof include Microlith Yellow 4G-A, Microlith Red BP-K, Microlith Blue 4G-T and Microlith Black C-T.

Various kinds of other pigments may be used, if desired, for example, calcium carbonate or titanium oxide as a pigment for a white ink, aluminum powder for a silver ink, and a copper alloy for a gold ink.

It is preferred that only one kind of a pigment is essentially used for one color from the standpoint of simplicity in the production of ink, but in some cases, two or more kinds of pigments are preferably used in combination. For instance, phthalocyanine is mixed with carbon black to produce a black ink. The pigment may be used after subjecting to a surface treatment by a known method, for example, a rosin treatment (as described in Non-patent Document 1 above).

The content of the colorant (pigment) in the whole ink composition is preferably in a range of from 0.1 to 50% by weight. The pigment amount is sufficient to provide good coloration on printed material with the content of 0.1% by weight or more, and the particles containing the colorant can be dispersed in the dispersion medium in good condition with the content of 50% by weight or less. The content of the colorant is more preferably from 1 to 30% by weight.

<Coating Agent>

In the ink composition according to the invention, it is preferred that the colorant, for example, a pigment is dispersed (reduced to particles) in the dispersion medium in the state coated with a coating agent rather than the colorant is directly dispersed (reduced to particles) therein. The charge owned by the colorant can be shielded by coating with the coating agent, whereby the desired charging characteristics can be imparted. Further, in the invention, after the inkjet recording onto a recording medium, the image thus recorded is fixed with heating means, for example, a heat roller, and at that time the coating agent is melted by heat to fix the image efficiently.

Examples of the coating agent include a rosin compound, a rosin-modified phenol resin, an alkyd resin, a (meth)acrylic polymer, polyurethane, polyester, polyamide, polyethylene, polybutadiene, polystyrene, polyvinyl acetate, an acetal-modified product of polyvinyl alcohol and polycarbonate. Among these, a polymer having a weight average molecular weight of from 2,000 to 1,000,000 and a polydispersion degree (weight average molecular weight/number average molecular weight) of from 1.0 to 5.0 is preferred in view of easiness in particle formation. Furthermore, a polymer having one of a softening point and a glass transition point of from 40 to 120° C. is preferred from the standpoint of easiness in fixation. As described above, the compound having pKb of 16 or less in water and containing a proton-acceptive neutral functional group may be used as one of constituting components of the coating agent.

Preferred examples of the coating agent used in the invention include a polymer containing at least one of constituting units represented by the following formulae (1) to (4).

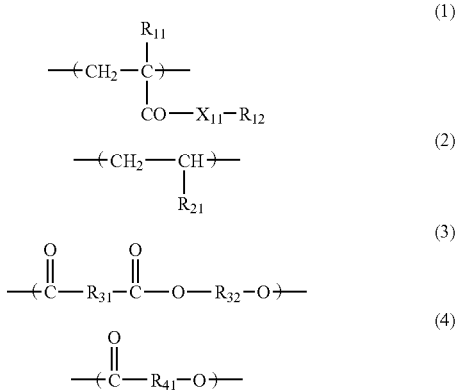

In the formulae, $X_{11}$ represents an oxygen atom or $-N(R_{13})-$; $R_{11}$ represents a hydrogen atom or a methyl group; $R_{12}$ represents a hydrocarbon group having from 1 to 30 carbon atoms; $R_{13}$ represents a hydrogen atom or a hydrocarbon group having from 1 to 30 carbon atoms; $R_{21}$ represents a hydrogen atom or a hydrocarbon group having from 1 to 20 carbon atoms; and $R_{31}$, $R_{32}$ and $R_{41}$ each independently represents a divalent hydrocarbon group having from 1 to 20 carbon atoms. The hydrocarbon group represented by any one of $R_{12}$, $R_{21}$, $R_{31}$, $R_{32}$ and $R_{41}$ may contain an ether bond, an amino group, a hydroxy group or a halogen atom.

The polymer having the constituting unit represented by formula (1) can be obtained by radical polymerization of a corresponding radical polymerizable monomer according to a known method. Examples of the radical polymerizable monomer include a (meth)acrylate, for example, methyl (meth)acrylate, ethyl(meth)acrylate, propyl(meth)acrylate, butyl(meth)acrylate, hexyl (meth)acrylate, octyl(meth)acrylate, 2-ethylhexyl (meth)acrylate, dodecyl(meth)acrylate, stearyl (meth)acrylate, cyclohexyl(meth)acrylate, phenyl (meth)acrylate, benzyl(meth)acrylate or 2-hydroxyethyl (meth)acrylate, and a (meth)acrylamide, for example, N-methyl(meth)acrylamide, N-propyl(meth)acrylamide, N-phenyl(meth)acrylamide or N,N-dimethyl(meth)acrylamide.

The polymer having the constituting unit represented by formula (2) can be obtained by radical polymerization of a corresponding radical polymerizable monomer according to a known method. Examples of the radical polymerizable monomer include ethylene, propylene, butadiene, styrene and 4-methylstyrene.

The polymer having the constituting unit represented by formula (3) can be obtained by dehydration condensation of a corresponding dicarboxylic acid or acid anhydride with a diol according to a known method. Examples of the dicarboxylic acid and acid anhydride include succinic anhydride, adipic acid, sebacic acid, isophthalic acid, terephthalic acid, 1,4-phenylenediacetic acid and diglycolic acid. Examples of the diol include ethylene glycol, 1,2-propanediol, 1,3-propanediol, 1,4-butanediol, 1,6-hexanediol, 1,10-decanediol, 2-butene-1,4-diol, 1,4-cyclohexanediol, 1,4-cyclohexanedimethanol, 1,4-benzenedimethanol and diethylene glycol.

The polymer having the constituting unit represented by formula (4) can be obtained by dehydration condensation of a corresponding carboxylic acid having a hydroxy group according to a known method, or by ring-opening polymerization of a cyclic ester of a corresponding carboxylic acid having a hydroxy group according to a known method. Examples of the carboxylic acid having a hydroxy group and cyclic ester thereof include 6-hydroxyhexanoic acid, 11-hydroxyundecanoic acid, hydroxybenzoic acid and ε-caprolactone.

The polymer containing at least one constituting unit represented by any one of formulae (1) to (4) may be a homopolymer of the constituting unit represented by any one of formulae (1) to (4), or may be a copolymer with other constituting component. The polymers may be used individually or in combination of two or more thereof, as the coating agent.

Particularly preferred examples of the coating agent include polyester, acrylic polymer, a styrene-acrylic copolymer, polyethylene and polyurethane, and most preferably, polyester, acrylic polymer, a styrene-acrylic copolymer and polyethylene.

The content of the coating agent in the whole ink composition is preferably in a range of from 0.1 to 40% by weight. The amount of the coating agent is sufficient to provide satisfactory fixing property with the content of 0.1% by weight or more, and particles containing the colorant and the coating agent can be produced in good condition with the content of 40% by weight or less.

<Dispersing Agent>

According to the invention, for example, a mixture of the colorant, the compound having pKb of 16 or less in water and containing a proton-acceptive neutral functional group, the charge controlling agent having pKa of 16 or less in water and containing a proton-donative group and preferably the coating agent is dispersed (reduced to particles) in the dispersion medium. It is more preferred to use a dispersing agent for the purpose of controlling the particle diameter and preventing the precipitation of particles.

Preferred examples of the dispersing agent include a surface active agent represented by a sorbitan fatty acid ester, for example, sorbitan monooleate, and a polyethylene glycol fatty acid ester, for example, polyoxyethylene distearate. Examples thereof further include a copolymer of styrene and maleic acid and an amine-modified product thereof, a copolymer of styrene and (meth)acrylic compound, a (meth)acrylic polymer, a copolymer of ethylene and (meth)acrylic compound, rosin, BYK-160, 162, 164 and 182 (brand names of polyurethane polymers, produced by BYK Chemie GmbH), EFKA-401 and 402 (brand names of acrylic polymers, produced by EFKA Additives B.V.), and Solsperse 17000 and 24000 (brand names of polyester polymers, produced by Zeneca PLC). According to the invention, such a polymer having a weight average molecular weight of from 1,000 to 1,000,000 and a polydispersion degree (weight average molecular weight/number average molecular weight) of from 1.0 to 7.0 is preferably used from the standpoint of storage stability of the ink composition for a long period of time. A graft polymer and a block polymer are most preferably used.

Particularly preferred examples of the polymer used as the dispersing agent in the invention include a graft polymer comprising a polymer component containing at least one of constituting units represented by formulae (5) and (6) shown below and a polymer component containing at least a graft chain containing a constituting unit represented by formula (7) shown below.

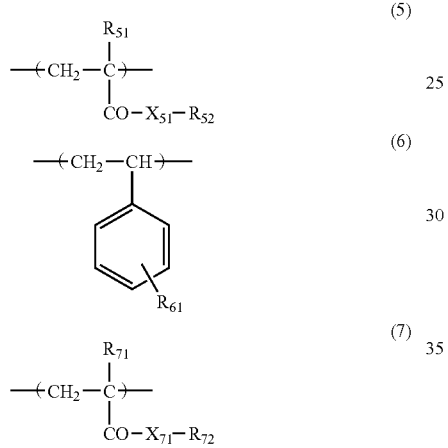

In the formulae, $X_{51}$ represents an oxygen atom or —N($R_{53}$)—; $R_{51}$ represents a hydrogen atom or a methyl group; $R_{52}$ represents a hydrocarbon group having from 1 to 10 carbon atoms; $R_{53}$ represents a hydrogen atom or a hydrocarbon group having from 1 to 10 carbon atoms; $R_{61}$ represents a hydrogen atom, a hydrocarbon group having from 1 to 20 carbon atoms, a halogen atom, a hydroxy group or an alkoxy group having from 1 to 20 carbon atoms; $X_{71}$ represents an oxygen atom or —N($R_{73}$)—; $R_{71}$ represents a hydrogen atom or a methyl group; $R_{72}$ represents a hydrocarbon group having from 4 to 30 carbon atoms; and $R_{73}$ represents a hydrogen atom or a hydrocarbon group having from 1 to 30 carbon atoms. The hydrocarbon group represented by any one of $R_{52}$ and $R_{72}$ may contain an ether bond, an amino group, a hydroxyl group or a halogen atom.

The graft polymer can be obtained in such a manner that a radical polymerizable monomer corresponding to formula (7) is polymerized, preferably in the presence of a chain transfer agent, a polymerizable functional group is introduced into a terminal of the resulting polymer, and the macromonomer thus formed is then copolymerized with a radical polymerizable monomer corresponding to any one of formulae (5) and (6).

Examples of the radical polymerizable monomer corresponding to formula (5) include a (meth)acrylate, for example, methyl(meth)acrylate, ethyl(meth)acrylate, propyl (meth)acrylate, butyl(meth)acrylate, hexyl (meth)acrylate, cyclohexyl(meth)acrylate, phenyl (meth)acrylate, benzyl (meth)acrylate or 2-hydroxyethyl (meth)acrylate, and a (meth)acrylamide, for example, N-methyl(meth)acrylamide, N-propyl(meth)acrylamide, N-phenyl(meth)acrylamide or N,N-dimethyl(meth)acrylamide.

Examples of the radical polymerizable monomer corresponding to formula (6) include styrene, 4-methylstyrene, chlorostyrene and methoxystyrene.

Examples of the radical polymerizable monomer corresponding to formula (7) include hexyl(meth)acrylate, octyl (meth)acrylate, 2-ethylhexyl(meth)acrylate, dodecyl(meth) acrylate and stearyl(meth)acrylate.

Specific examples of the graft polymer include polymers represented by the following structural formulae.

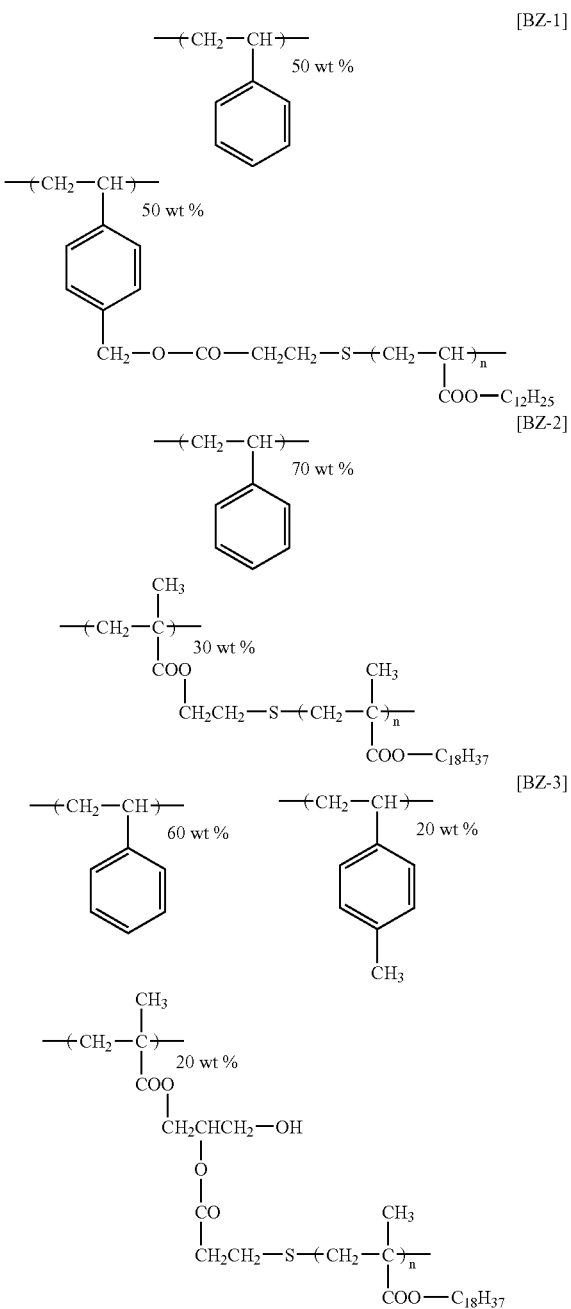

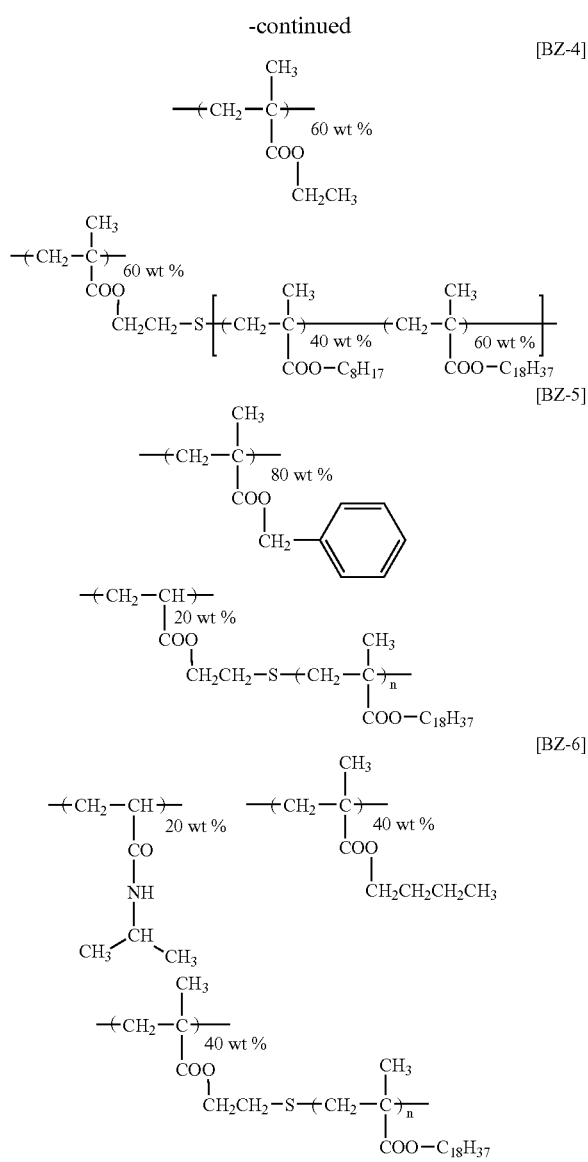

The graft polymer comprising a polymer component containing at least one of constituting units represented by formulae (5) and (6) and a polymer component containing at least a graft chain containing a constituting unit represented by formula (7) may contain only the constituting units represented by formulae (5) and/or (6) and formula (7), and may also contain other constituting component. The weight ratio of the polymer component containing the graft chain and the other polymer component is preferably in a range of from 10/90 to 90/10. The range is preferred since formation of particles can be attained in good condition and the desired particle diameter can be easily obtained. The polymers may be used individually or in combination of two or more thereof, as the dispersing agent.

The content of the dispersing agent in the whole ink composition is preferably in a range of from 0.01 to 30% by weight. Within such a range, the formation of particles can be attained in good condition and the desired particle diameter can be obtained.

<Other Components>

According to the invention, other components, for example, an antiseptic agent for preventing decomposition or a surface active agent for controlling surface tension may further be incorporated into the ink composition depending on purposes.

<Preparation of Charged Particle>

The ink composition containing the charged particles according to the invention can be prepared by dispersing (reducing to particles) the colorant the compound having pKb of 16 or less in water and containing a proton-acceptive neutral functional group, the charge controlling agent having pKa of 16 or less in water and containing a proton-donative group and preferably the coating agent, if desired, together with the above-described components. Examples of the method for dispersing (reducing to particles) include the following methods.

(1) The colorant, the compound having pKb of 16 or less in water and containing a proton-acceptive neutral functional group and the coating agent are mixed, the mixture is dispersed (reduced to particles) by using the dispersing agent and the dispersion medium, and then the charge controlling agent having pKa of 16 or less in water and containing a proton-donative group is added to the resulting dispersion.

(2) The colorant, the compound having pKb of 16 or less in water and containing a proton-acceptive neutral functional group, the coating agent, the dispersing agent and the dispersion medium are simultaneously dispersed (reduced to particles), and then the charge controlling agent having pKa of 16 or less in water and containing a proton-donative group is added to the resulting dispersion.

(3) The colorant, the compound having pKb of 16 or less in water and containing a proton-acceptive neutral functional group, the charge controlling agent having pKa of 16 or less in water and containing a proton-donative group, the coating agent, the dispersing agent and the dispersion medium are simultaneously dispersed (reduced to particles).

Examples of an apparatus for use at the mixing or dispersing include a kneader, a disolver, a mixer, a high-speed disperser, a sand mill, a roll mill, a ball mill, an attritor and a beads mill (as described in Non-patent Document 1).

The ink particle (charged particle) in the invention suitably has a diameter of from 0.5 to 4 µm, preferably from 0.7 to 3.5 µm, and more preferably from 0.8 to 3 µm. The size is larger than that of toner for conventional electrophotographic liquid developer (from 0.1 to 0.4 µm) and is smaller than that of toner for conventional electrophotographic dry developer (from 5 to 15 µm).

The viscosity (at 20° C.) of the ink composition according to the invention is preferably in a range of from 0.5 to 5 mPa·s, and more preferably in a range of from 0.8 to 4 mPa·s. The surface tension of the ink composition according to the invention is preferably in a range of from 10 to 70 mN/m, and more preferably in a range of from 15 to 50 mN/m.

<Inkjet Recording Apparatus>

According to the invention, the ink composition described above is used for recordation on a recording medium by an inkjet recording system. In the invention, it is preferred to use an inkjet recording system utilizing an electrostatic field. In the inkjet recording system utilizing an electrostatic field, a voltage is applied between a control electrode and a back electrode positioned on the back side of the recording medium, whereby the charged particles in the ink composition are concentrated at an ejection position through an electrostatic force to cause the ink composition to fly from the ejection position to the recording medium. With respect to the voltage applied between the control electrode and the back electrode, in case of using the charged particles having positive charge, for example, the control electrode acts as a positive electrode and the back electrode acts as a negative electrode. The same effect can be obtained by charging the recording medium instead of the application of voltage to the back electrode.

Examples of the method for flying an ink include a method of flying an ink from a tip of a member having a needle shape such as an injection needle, which can be used for recordation with the ink composition according to the invention. In the method, however, replenishment of the charged particles after the concentration of charged particles and ejection is difficult, and thus it is difficult to stably conduct the recordation for a long period of time. Since the charged particles are forcedly supplied in the method, the ink is overspilled from the tip of the injection needle in the case of circulating the ink. Accordingly, the meniscus shape at the tip of the injection needle at the ejection position is not stabilized to make stable recordation difficult. Therefore, the method is suitable for recordation for a short period of time.

On the contrary, a method in which the ink composition is circulated without spillover of the ink composition from an ejection opening is preferably used. For instance, a method wherein an ink is circulated in an ink chamber having an ejection opening and a voltage is applied to a control electrode formed around the ejection opening to cause concentrated ink droplets to fly from a tip of an ink guide disposed in the ejection opening and directed to a recording medium simultaneously satisfies both the replenishment of the charged particles by circulation of the ink composition and the stabilization of the meniscus at the ejection position. Thus, the method is capable of perform stable recordation for a long period of time. Furthermore, since the ink comes in contact with the outside air only at a significantly small area, i.e., the ejection opening, the solvent can be prevented from being evaporated to stabilize the physical property of the ink composition. Accordingly, the method is preferably used in the invention.

An example of a construction of an inkjet recording apparatus suitable for application of the ink composition according to the invention will be described below.

An apparatus for performing four color printing on one side of a recording medium as shown in FIG. 1 will be described below.

The inkjet recording apparatus 1 shown in FIG. 1 has an ejection head 2 for conducting full color image formation constituted by ejection heads 2C, 2M, 2Y and 2K for four colors, an ink circulation system 3 for supplying an ink to the ejection head 2 and recovering the ink from the ejection head 2, a head driver 4 for driving the ejection head 2 based on output from an external device, for example, a computer or RIP (raster image processor), which is not shown, and a position controlling means 5. The inkjet recording apparatus 1 also has a conveying belt 7 stretched with three rollers 6A, 6B and 6C, a conveying belt position detecting means 8 constituted by an optical sensor or the like capable of detecting the position in the width direction of the conveying belt 7, an electrostatic adsorption means 9 for retaining a recording medium P on the conveying belt 7, and a static eliminating means 10 and a mechanical means 11 for releasing the recording medium P from the conveying belt 7 after the completion of image formation. A feed roller 12 and a guide 13 for feeding the recording medium P from a paper stock, which is not shown, to the conveying belt 7 are disposed on the upstream side of the conveying belt 7, and an image fixing means 14 and a guide 15 for fixing the ink on the recording medium P after releasing and conveying the recording medium P to a paper stocker, which is not shown, are disposed on the downstream side of the conveying belt 7. The inkjet recording apparatus 1 has a recording medium position detecting means 16 at a position opposite to the ejection head with respect to the conveying belt 7, and a solvent recover part containing an exhaust fan 17 and a solvent vapor adsorbent 18 for recovering a solvent vapor generated from the ink composition, by which the vapor inside the apparatus is exhausted to the exterior of the apparatus through the solvent recover part.

The feed roller 12 is disposed to improve feeding capability of the recording medium. As the feed roller, a known roller may be used. Since the recording medium P often has dusts and paper powder attached there it is desired to remove these materials. The recording medium P thus fed by the feed roller 12 is conveyed to the conveying belt 7 through the guide 13. The back surface (preferably a metallic back surface) of the conveying belt 7 is disposed through the roller 6A. The recording medium thus conveyed is electrostatically adsorbed on the conveying belt with the electrostatic adsorption means 9. In the embodiment shown in FIG. 1, the electrostatic adsorption is attained by a scorotron charging device connected to a negative high voltage electric source. The recording medium P is electrostatically adsorbed on the conveying belt 7 without space and is uniformly charged over the surface thereof by the electrostatic adsorption means 9. While the electrostatic adsorption means is also used as a charging means of the recording medium in this embodiment, these means may be separately provided. The recording medium P thus charged is conveyed by the conveying belt 7 to the position of the ejection head, and recording signal voltage is superposed on the charged potential as bias to attain electrostatic inkjet image formation. The recording medium P having the image thereon is subjected to elimination of static by the static eliminating means 10 and released from the conveying belt 7 by the mechanical means 11 followed by being conveyed to the fixing part The recording medium P thus released is delivered to the image fixing means 14 for fixing. The recording medium P thus fixed is delivered to the paper stocker, which is not shown. The apparatus has a recovery means for the solvent vapor generated from the ink composition. The recovery means has the solvent vapor adsorbent 18. The gas containing the solvent vapor inside the apparatus is introduced into the absorbent by the exhaust fan 17, and after adsorbing and recovering the solvent vapor, the gas is exhausted to the exterior of the apparatus. The apparatus is not limited to the above-described embodiment, and the numbers, shapes, relative positions and charging polarities of the constituting devices including, for example, the roller and the charging device, can be appropriately selected. Further, while the four-color printing is attained in the above-described system, multi-color systems exceeding four colors may be constituted by combining a light-color ink and a special color ink.

The inkjet recording apparatus used in the inkjet printing system has the ejection head 2 and the ink circulation system 3. The ink circulation system 3 has an ink tank, an ink circulation device, an ink concentration controlling device, an ink temperature controlling device and the like, and the ink tank may contain a stirring device therein.

As the ejection head 2, a single channel head, a multi-channel head and a full-line head may be used, and the main scanning is carried out by movement of the conveying belt 7.

An inkjet head that can be preferably used in the invention is one for such an inkjet system that the charged particles is electrophoresed in an ink flow channel to increase the ink concentration in the vicinity of the opening, so as to eject the ink, and the ejection of ink droplets is carried out mainly through an electrostatic attraction force caused by the recording medium or a counter electrode disposed on the back side of the recording medium. Therefore, in the case where the recording medium or the counter electrode does not face the head and in the case where no voltage is applied to the recording medium or the counter electrode even though they face the head, ink droplets are not ejected even when the voltage is accidentally applied to the ejection electrode or vibration is applied to the head, whereby the interior of the apparatus is prevented from being contaminated.

Figure 2:
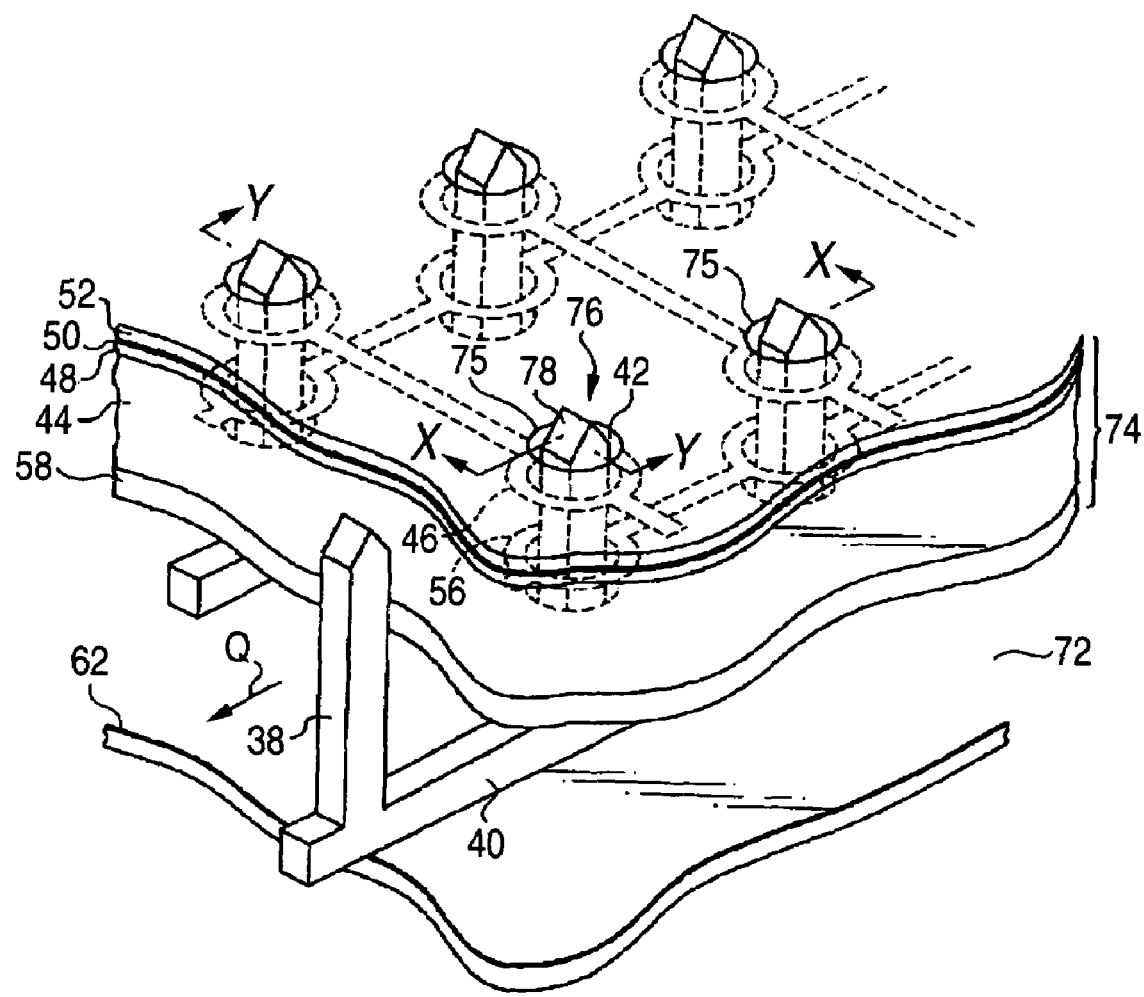
FIG. 2 is a perspective view showing a constitution of an inkjet head of the inkjet recording apparatus used in the invention. For the sake of easy understanding, an edge of guard electrode in each ejection part is not shown.
Figure 3:
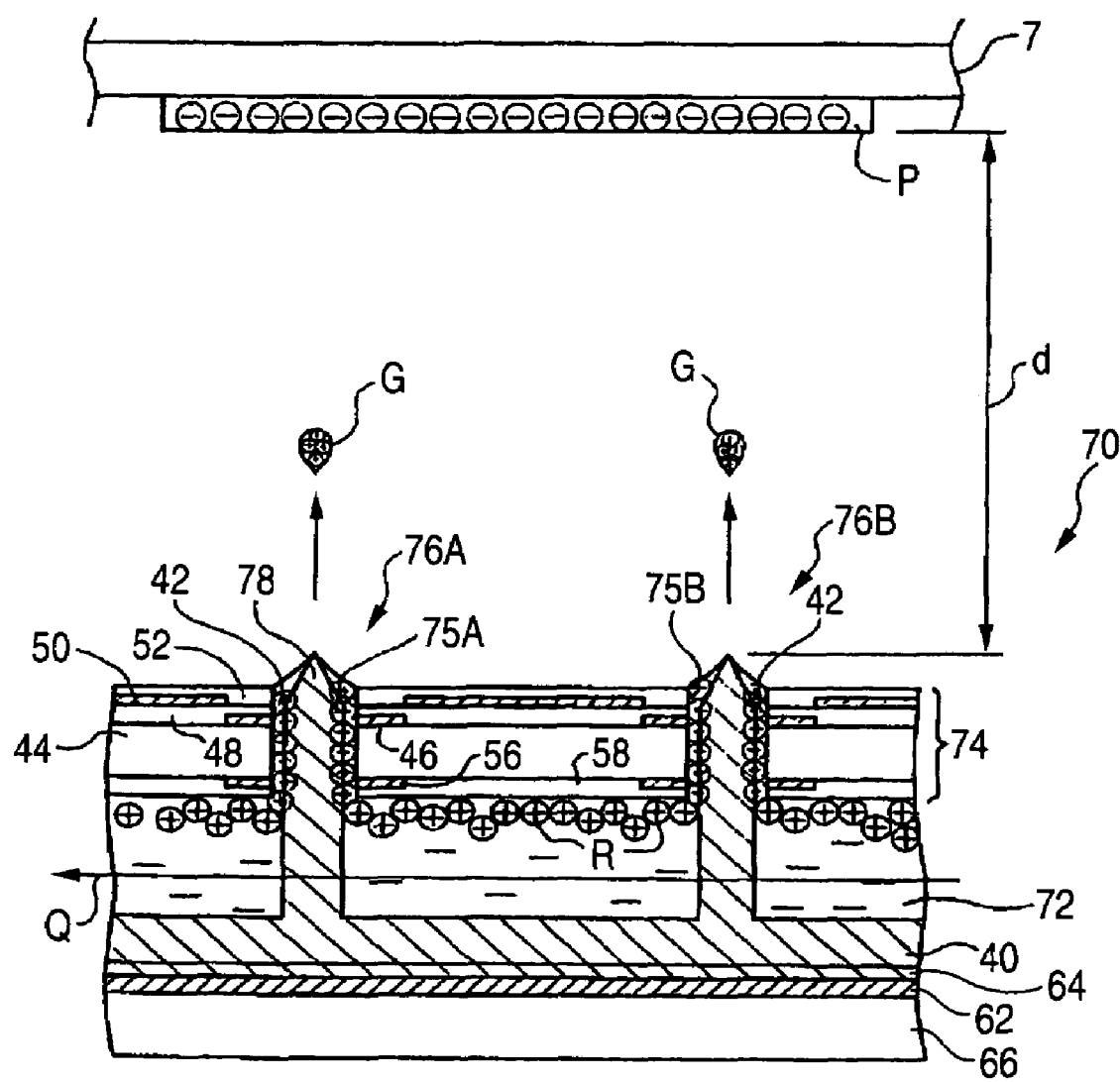
FIG. 3 is a side cross sectional view along with a line X-X in FIG. 2 showing a distribution state of charged particles where the number of ejection parts in the inkjet head shown in FIG. 2 is large.

An ejection head that is preferably used in the above-described inkjet apparatus is shown in FIGS. 2 and 3. As shown in FIGS. 2 and 3, and inkjet head 70 has a substrate 74 electrically insulating and constituting an upper wall of an ink flow channel 72 forming a unidirectional ink flow Q, and plural ejection parts 76 ejecting the ink toward the recording medium P. The ejection part 76 is provided with an ink guide part 78 for guiding an ink droplet G flying from an ink flow channel 72 toward the recording medium P, and the substrate 74 has openings 75 through which the ink guide parts 78 penetrate, respectively. An ink meniscus 42 is formed between the ink guide part 78 and an inner wall of the opening 75. A gap d between the ink guide part 78 and the recording medium P is preferably from about 200 to about 1,000 μm. The ink guide part 78 is fixed at the lower end thereof to a supporting bar 40.

The substrate 74 has an insulating layer 44 electrically insulating two ejection electrodes with a prescribed distance, a first ejection electrode 46 provided on the upper side of the insulating layer 44, an insulating layer 48 covering the first ejection electrode 46, a guard electrode 50 provided on the upper side of the insulating layer 48, and an insulating layer 52 covering the guard electrode 50. The substrate 74 also has a second ejection electrode 56 provided on the lower side of the insulating layer 44, and an insulating layer 58 covering the second ejection electrode 56. The guard electrode 50 is provided for preventing the adjacent ejection parts from the influence on electric field due to a voltage applied to the first ejection electrode 46 or the second ejection electrode 56.

The inkjet head 70 also has a floating electroconductive plate 62 constituting a bottom surface of the ink flow channel 72 in an electrically floating state. The floating electroconductive plate 62 also works to electrophorese the positively charged ink particles (charged particles) in the ink flow channel 72 upward (i.e., toward the recording medium) with an induced voltage steadily generated by a pulsewise injection voltage applied to the first ejection electrode 46 and the second ejection electrode 56. The floating electroconductive plate 62 has formed on the surface thereof a coating film 64 electrically insulating for preventing the physical property and the composition of the ink from being destabilized due to charge injection into the ink. The electrically insulating coating film preferably has an electric resistance of $10^{12}$ Ω·cm or more, and more preferably $10^{13}$ Ω·cm or more. The electrically insulating coating film is preferably corrosion resistant to the ink, whereby the floating electroconductive plate 62 is prevented from being corroded by the ink. The floating electroconductive plate 62 is covered from underneath with an insulating member 66. According to the constitution, the floating electroconductive plate 62 is in a completely electrically insulating state.

At least one floating electroconductive plate 62 is provided on each of the unit heads. For example, in the case where four unit heads of C, M, Y and K are used, the unit heads each has at least one floating electroconductive plate, and the unit heads C and M, for example, do not have one floating electroconductive plate in common.

In order to fly the ink from the inkjet head 70 to record on the recording medium P, as shown in FIG. 3, a prescribed voltage (for example, +100 V) is applied to the guard electrode 50 in such a state that the ink is circulated in the ink flow channel 72 to form an ink flow Q. Further, a positive voltage is applied to the first ejection electrode 46, the second ejection electrode 56 and the recording medium P to form such a flying electric field, among the first ejection electrode 46, the second ejection electrode 56 and the recording medium P, that the positive charged particles R in the ink droplets G flying from the opening 75 as guided with the ink guide part 78 are attracted by the recording medium P. For example, in the case where the gap d is 500 μm, the voltage may be applied such an extent that a potential difference of from about 1 to about 3.0 kV is formed.

In the above-described state, a pulse voltage is applied to the first ejection electrode 46 and the second ejection electrode 56 according to the image signal, whereby the ink droplets G with an increased charge particle concentration are ejected from the opening 75. For example, in the case where the initial charged particle concentration is from 3 to 15%, the charged particle concentration of the ink droplets G is 30% or more.

At that time, the voltage applied to the first ejection electrode 46 and the second ejection electrode 56 is previously adjusted in such a manner that the ink droplets G are ejected only when the pulse voltage is applied to both the first ejection electrode 46 and the second ejection electrode 56.

Upon applying the pulsewise positive voltage, the ink droplets G fly from the opening 75 as guided by the ink guide part 78 to attach on the recording medium P, and at the same time, a positive induction voltage is generated in the floating electroconductive plate 62 by the positive voltage applied to the first ejection electrode 46 and the second ejection electrode 56. Even in the case where the voltage applied to the first ejection electrode 46 and the second ejection electrode 56 has a pulse wise form the induct ion voltage is a substantially steady voltage. Therefore, the positively charged particles R in the ink flow channel 72 receive a force of moving them upward by the electric field formed among the floating electroconductive plate 62, the guard electrode 50 and the recording medium P, whereby the concentration of the charged particles R is increased in the vicinity of the substrate 74. In the case where the number of the ejection parts (i.e., channels for ejecting ink droplets) used is large as shown in FIG. 3, the number of charged particles required for ejection is also increased. In such a case, the numbers of the first ejection electrodes 46 and the second ejection electrodes 56 used are also increased to generate a higher induction voltage in the floating electroconductive plate 62, whereby the number of the charged particles R moving toward the recording medium is increased.

While the case where the colored particles are positively charged is described in the above embodiment, the colored particles may be negatively charged. In the later case, the charging polarities are all inverted.

It is preferred in the invention that after ejecting the ink on the recording medium, the ink is fixed by an appropriate heating means. Examples of the heating means used include a contact heating device, for example, a heating roller, a heating block and a heating belt, and a non-contact heating device, for example, a dryer, an infrared ray lamp, a visible ray lamp, an ultraviolet ray lamp and a hot air oven. The heating device is preferably provided continuously to the inkjet recording apparatus and integrated thereto. The temperature of the recording medium at the fixing is preferably in a range of from 40 to 200° C. from the standpoint of easiness of fixing. The period of time for fixing is preferably in a range of from 1 psec to 20 seconds.

<Replenishment of Ink Composition>

In the inkjet recording system utilizing an electrostatic field, the charged particles in the ink composition is concentrated and ejected. Therefore, the amount of the charged particles in the ink composition is reduced after ejecting the ink composition for a long period of time to lower the electric conductivity of the ink composition. The ratio of the electric conductivity of the charged particles to the electric conductivity of the ink composition is also changed. Further, there is such a tendency that the charged particles having larger diameter are ejected before the charged particles having smaller diameter, and thus the average particle diameter of the charged particles is decreased. Moreover, the content of the solid matters in the ink composition is changed to vary the viscosity thereof.

The changes in physical properties of the ink composition result in ejection failure, and decrease in optical density and blur of ink occur in the image thus recorded. Accordingly, an ink composition having a higher concentration (a higher concentration of solid matters) than the ink composition initially charged in the ink tank is replenished to prevent decrease in the amount of the charged particles, whereby the electric conductivity of the ink composition and the ratio of the electric conductivity of the charged particles to the electric conductivity of the ink composition can be maintained within certain ranges. The average particle diameter of the charged particles and the viscosity of the ink can also be maintained. Furthermore, since the physical properties of the ink composition are maintained within certain ranges, the ejection of ink can be performed stably and uniformly for a long period of time. The replenishment is preferably carried out mechanically or by humans after the physical properties of the ink composition, for example, the electric conductivity or the optical density, are detected to calculate the necessary replenishing amount. The replenishment may also be carried out mechanically or by humans after calculation of an amount of the ink composition to be used based on an image data.

<Recording Medium>

In the invention, various kinds of recording media may be used depending on use. For example, a printed material can be directly obtained by inkjet recording on paper, a plastic film, a metal, paper having a plastic or a metal laminated or deposited thereon, or a plastic film having a metal laminated or deposited thereon. An offset printing plate can be obtained by using a metallic support, for example, aluminum, having a roughened surface. A flexographic printing plate and a color filter for a liquid crystal display can be obtained by using a plastic support. The recording medium may have a flat shape, for example, a sheet form, or a stereoscopic shape, for example, a cylindrical form. The invention can also be applied to the production of a semiconductor device and a printed circuit board by using a silicon wafer and a circuit board as the recording medium.

According to the combination of the ink composition, the inkjet recording apparatus and the replenishment of the ink composition, image recorded materials having a high image density and high image quality without blur of ink can be stably obtained for a long period of time.

The invention will be described in more detail with reference to the following examples, but the invention should not be construed as being limited thereto.

1. Preparation of Polymer Containing a proton-acceptive Neutral Functional Group <Proton-acceptive Neutral Functional Group-containing polymer 1>

In a three-necked flask were charged 65 g of butyl methacrylate (produced by Wako Pure Chemical Industries, Ltd.), 30 g of methyl methacrylate (produced by Wako Pure Chemical Industries, Ltd.), 5 g of N,N-dimethylaminoethyl methacrylate (having pKb of 3.6) (produced by Tokyo Kasei Kogyo Co., Ltd.) and 230 g of 1-methyoxy-2-propanol. The mixture was heated to 80° C. in an oil bath and stirred for 30 minutes while introducing nitrogen gas at a rate of 30 liters/minute. To the reaction solution was added 0.3 g of azo-series initiator, dimethyl 2,2'-azobis(isobutyrate) (V601 produced by Wako Pure Chemical Industries, Ltd.) and it was stirred at 80° C. for 5 hours to conduct polymerization. After a lapse of 5 hours, 0.15 g of V601 produced by Wako Pure Chemical Industries, Ltd. was added to the reaction solution, the temperature was raised to 90° C. and the reaction solution was stirred for 2 hours to conduct polymerization. After the completion of the polymerization reaction, the reaction solution was cooled to room temperature. The reaction solution was then poured into 3 liters of water to purify by reprecipitation, and the resulting deposit was filtered and dried in vacuum to obtain about 95 g of Proton-acceptive neutral functional group-containing polymer 1. The weight average molecular weight of the resulting polymer was 43,000.

<Proton-acceptive Neutral Functional Group-containing polymer 2>

The method of preparation of Proton-acceptive neutral functional group-containing polymer 1 was repeated except for using 95 g of benzyl methacrylate (produced by Tokyo Kasei Kogyo Co., Ltd.) and 5 g of N,N-diethylaminoethyl methacrylate (having pKb of 3.1) (produced by Tokyo Kasei Kogyo Co., Ltd.) as the monomers to prepare about 97 g of Proton-acceptive neutral functional group-containing polymer 2. The weight average molecular weight of the resulting polymer was 38,000.

<Proton-acceptive Neutral Functional Group-containing polymer 3>

The method of preparation of Proton-acceptive neutral functional group-containing polymer 1 was repeated except for using 70 g of butyl methacrylate (produced by Wako Pure Chemical Industries, Ltd.), 25 g of methyl methacrylate (produced by Wako Pure Chemical Industries, Ltd.), 5 g of N,N-diethylaminoethyl methacrylate-(having pKb of 3.1) (produced by Tokyo Kasei Kogyo Co., Ltd.) as the monomers to prepare about 95 g of Proton-acceptive neutral functional group-containing polymer 3. The weight average molecular weight of the resulting polymer was 33,000.

<Proton-acceptive Neutral Functional Group-containing Polymer 4>

The method of preparation of Proton-acceptive neutral functional group-containing polymer 1 was repeated except for using 70 g of butyl methacrylate (produced by Wako Pure Chemical Industries, Ltd.), 25 g of methyl methacrylate (produced by Wako Pure Chemical Industries, Ltd.), 5 g of vinyl pyridine (having pKb of 5.2) (produced by Nacalai Tesque, Inc.) as the monomers to prepare about 94 g of Proton-acceptive neutral functional group-containing polymer 4. The weight average molecular weight of the resulting polymer was 20,000.

<Proton-acceptive Neutral Functional Group-containing Polymer 5>

The method of preparation of Proton-acceptive neutral functional group-containing polymer 1 was repeated except for using 90 g of benzyl methacrylate (produced by Tokyo Kasei Kogyo Co., Ltd.) and 10 g of N-vinyl imidazole (having pKb of 7.0) (produced by Tokyo Kasei Kogyo Co., Ltd.) as the monomers to prepare about 97 g of Proton-acceptive neutral functional group-containing polymer 5. The weight average molecular weight of the resulting polymer was 38,000.

<Proton-acceptive Neutral Functional Group-containing Polymer 6>

The method of preparation of Proton-acceptive neutral functional group-containing polymer 1 was repeated except for using 60 g of styrene (produced by Wako Pure Chemical Industries, Ltd.), 30 g of butyl acrylate (produced by Wako Pure Chemical Industries, Ltd.) and 10 g of tert-butylaminoethyl methacrylate (having pKb of 4.1) (produced by JPN Chemical Co., Ltd.) as the monomers to prepare about 96 g of Proton-acceptive neutral functional group-containing polymer 6. The weight average molecular weight of the resulting polymer was 26,000.

<Proton-acceptive Neutral Functional Group-containing Polymer 7>

The method of preparation of Proton-acceptive neutral functional group-containing polymer 1 was repeated except for using 90 g of benzyl methacrylate (produced by Tokyo Kasei Kogyo Co., Ltd.) and 10 g of N,N-dimethylaminoethyl acrylate (having pKb of 3.6) (produced by Tokyo Kasei Kogyo Co., Ltd.) as the monomers to prepare about 94 g of Proton acceptive neutral functional group-containing polymer 7. The weight average molecular weight of the resulting polymer was 29,000.

2. Preparation of Charge Controlling Agent Having a Proton-donative Group

<Charge Controlling Agent Having a Proton-donative Group (a)>

In a three-necked flask were charged 80 g of lauryl methacrylate (produced by Wako Pure Chemical Industries, Ltd.), 20 g of methacrylic acid (having pKa of 3.6) (produced by Wako Pure Chemical Industries, Ltd.) and 230 g of tetrahydrofuran (THF). The mixture was heated to 75° C. in an oil bath and stirred for 30 minutes while introducing nitrogen gas at a rate of 30 liters/minute. To the reaction solution was added 1.5 g of an initiator (V65 produced by Wako Pure Chemical Industries, Ltd.) and it was stirred at 75° C. for 4 hours to conduct polymerization. After a lapse of 4 hours, 0.75 g of V65 (produced by Wako Pure Chemical Industries, Ltd.) was added to the reaction solution, the temperature was raised to 80° C. and the reaction solution was stirred for 3 hours to conduct polymerization. After the completion of the polymerization reaction, the reaction solution was cooled to room temperature. The reaction solution was then poured into 3 liters of methanol to purify by reprecipitation, and the resulting deposit was filtered and dried in vacuum to obtain about 93 g of Charge controlling agent having a proton-donative group(a). The weight average molecular weight of Charge controlling agent having a proton-donative group (a) was 53,000.

<Charge Controlling Agent Having a Proton-donative Group (b)>

The method of preparation of Charge controlling agent having a proton-donative group (a) was repeated except for using 80 g of stearyl methacrylate (produced by Tokyo Kasei Kogyo Co., Ltd.) and 20 g of methacrylic acid (having pKa of 3.6) (produced by Wako Pure Chemical Industries, Ltd.) as the monomers to prepare about 95 g of Charge controlling agent having a proton-donative group (b). The weight average molecular weight of Charge controlling agent having a proton-donative group (b) was 68,000.

<Charge Controlling Agent Having a Proton-donative Group (c)>

The method of preparation of Charge controlling agent having a proton-donative group (a) was repeated except for using 75 g of stearyl acrylate (produced by Tokyo Kasei Kogyo Co., Ltd.) and 25 g of acrylic acid (having pKa of 3.6) (produced by Wako Pure Chemical Indstries, Ltd.) as the monomers to-prepare about 92 g of Charge controlling agent having a proton-donative group (c). The weight average molecular weight of Charge controlling agent having a proton-donative group (c) was 48,000.

<Charge Controlling Agent Having a Proton-donative Group (d)>

The method of preparation of Charge controlling agent having a proton-donative group (a) was repeated except for using 80 g of lauryl methacrylate (produced by Wako Pure Chemical Industries, Ltd.) and 20 g of acrylamido-2-dimethylpropanesulfonic acid (having pKa of 1.1) (produced by Tokyo Kasei Kogyo Co., Ltd.) as the monomers to prepare about 94 g of Charge controlling agent having a proton-donative group (d). The weight average molecular weight of Charge controlling agent having a proton-donative group (d) was 43,000.

<Charge Controlling Agent Having a Proton-donative Group (e)>

The method of preparation of Charge controlling agent having a proton-donative group (a) was repeated except for using 80 g of lauryl methacrylate (produced by Wako Pure Chemical Industries, Ltd.) and 20 g of 2-methacryloyloxyethyl phthalate (having pKa of 4.0) (produced by Wako Pure Chemical Industries, Ltd.) as the monomers to prepare about 91 g of Charge controlling agent having a proton-donative group(e). The weight average molecular weight of Charge controlling agent having a proton-donative group (e) was 54,000.

<Charge Controlling Agent Having a Proton-donative Group (f)>

The method of preparation of Charge controlling agent having a proton-donative group (a) was repeated except for using 80 g of lauryl methacrylate (produced by Wako Pure Chemical Industries, Ltd.) and 20 g of ethylene glycol methacrylate phosphate (having pKa of 2.5) (produced by Sigma-Aldrich Co.) as the monomers to prepare about 93 g of Charge controlling agent having a proton-donative group (f). The weight average molecular weight of Charge controlling agent having a proton-donative group (f) was 47,000.

EXAMPLE 1

<Materials Used>

The following materials were used in Example 1. Cyan pigment (colorant): Phthalocyanine pigment, C.I. Pigment Blue (15:3) (LIONOL BLUE FG-7350, produced by Toyo Ink Mfg. Co., Ltd.)

Coating agent: Butyl acrylate/methyl methacrylate (75/25% by weight) copolymer (produced by Sigma-Aldrich Co.)

Proton-acceptive neutral functional group containing compound: Imidazole (pKb: 7.0)(produced by Wako Pure Chemical Industries, Ltd.)

Dispersing Agent: BZ-2

Charge controlling agent having pKa of 16 or less in water and containing a proton-donative group: CT-1 (pKa: 3.1)
Dispersion medium: Isopar G (produced by Exxon Corp.)

The chemical structures of Dispersing agent BZ-2 and Charge controlling agent CT-1 are shown below.

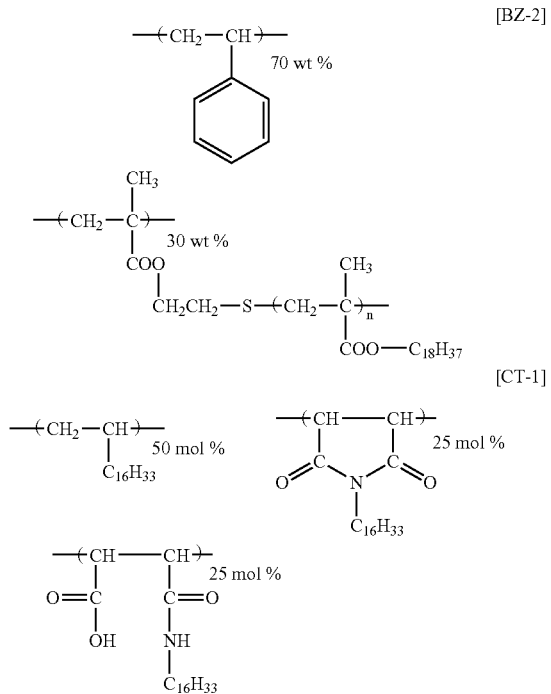

Dispersing agent BZ-2 was obtained in the following manner. Stearyl methacrylate was subjected to radical polymerization in the presence of 2-mercaptoethanol, and the resulting polymer was then reacted with methacrylic anhydride to obtain a stearyl methacrylate polymer having a methacryloyl group at the terminal thereof (having a weight average molecular weight of 7,600). The polymer was subjected to radical polymerization with styrene to obtain Dispersing agent BZ-2, which had a weight average molecular weight of 110,000.

Charge controlling agent CT-1 was obtained by reacting a copolymer of 1-octadecene and maleic anhydride with 1-hexadecylamine. Charge controlling agent CT-1 had a weight average molecular weight of 17,000.

<Preparation of Ink Composition EC-1>

In a desktop kneader (PBV-0.1 produced by Irie Shokai Co., Ltd.) were charged 10 g of the cyan pigment, 18 g of the coating agent (butyl acrylate/methyl methacrylate (75/25% by weight) copolymer (produced by Sigma-Aldrich Co.)) and 2 g of the proton-acceptive neutral functional group-containing compound (imidazole (produced by Wako Pure Chemical Industries, Ltd.)), and the components were mixed under heating at a heater temperature set at 100° C. for 2 hours. Thirty grams of the mixture thus obtained was coarsely pulverized in a trio blender (produced by Trio Science Co., Ltd.), and then finely pulverized in a sample mill (Model SK-M10 produced by Kyoritsu Riko Co., Ltd.). Thirty grams of the finely pulverized product thus obtained was preliminary dispersed in a paint shaker (produced by Toyo Seiki Seisaku-Sho, Ltd.) together with 7.5 g of the dispersing agent (BZ-2), 75 g of Isopar G and glass beads having a diameter of about 3.0 mm. After removing the glass beads, the mixture was further dispersed (reduced to particles) together with zirconia ceramic beads having a diameter of about 0.6 mm in a Dino-mill (Type KDL produced by Shinmaru Enterprises Corp.) at a rotation number of 2,000 rpm for 5 hours while maintaining an inner temperature at 25° C. and then for further 5 hours at 45° C. The zirconia ceramic beads were removed from the resulting dispersion liquid, then 316 g of Isopar G and 0.6 g of the charge controlling agent having pKa of 16 or less in water and containing a proton-donative group (CT-1) were added thereto to obtain Ink composition EC-1.

In the ink composition thus-obtained, the particle diameter of the particle component was 0.93 μm and the content of the particle component having a diameter of 0.2 μm or smaller was 0.6% or less.

<Inkjet Recording and Evaluation of Image>

Ink composition EC-1 of Example 1 was charged in an ink tank of an inkjet recording apparatus as shown in FIG. 1. An ejection head used was a 833-channel head of 150 dpi (three rows having a channel density of 50 dpi arranged in a stagger pattern) having the structure as shown in FIG. 2, and a fixing means used was a heat roller made of silicone rubber having a built-in 1 kW heater. An immersion heater and stirring blades were provided as the ink temperature controlling means in the ink tank, and the ink temperature was set at 30° C., which was control-led with a thermostat while rotating the stirring blades at 30 rpm. The stirring blades were also used as a stirring means for preventing precipitation and aggregation. A part of the ink flow channel was made transparent, at outside of which an LED light emitting element and a photodetector element were provided, and based on the output signals therefrom, the concentration of the ink composition was controlled by adding a diluent for ink (Isopar G) or a concentrated ink composition (which had twice the solid concentration of the ink composition described above). Fine coated paper for offset printing was used as a recording medium. After removing dusts on the surface of the recording medium by suction with an air pump, the ejection head was moved to the image forming position closely to the recording medium. Image data to be recorded were sent to the image data operating and controlling part, and the ink composition was ejected with sequential movement of the ejection head while the recording medium was conveyed through rotation of a conveying belt so as to form an image with a drawing resolution of 2,400 dpi. The conveying belt used was a belt prepared by laminating a metallic belt and a polyimide film, and a linear marker was provided in the conveying direction near one side of the belt. The marker was optically read by a conveying belt position detecting means and the position controlling means was driven to conduct the image formation.

The distance between the ejection head and the recording medium was maintained at 0.5 mm based on output from an optical gap detecting device. The surface potential of the recording medium at ejection was set at −1.5 kV, and a pulse voltage of +500 V (with a pulse width of 50 μsec) was applied at ejection to conduct the image formation with a driving frequency of 15 kHz.

With the resulting gray scale image recorded product (printed material), degrees of streak unevenness and ink blur were evaluated.

<Evaluation of Charge>

The charge amount of the ink composition was determined based on the specific conductivity obtained by measuring under the conditions of an applied voltage of 5 V and frequency of 1 kHz using an LCR meter and an electrode for liquid (Model LP-05 produced by Kawaguchi Electric Works Co., Ltd.). The conductivity of the ink particle was determined by subtracting the specific conductivity of a supernatant obtained by centrifugation of the ink composition from the specific conductivity of the whole ink composition. The centrifugation was conducted at a rotation number of 14,500 rpm and at a temperature of 23° C. for 30 minutes using a small-sized high speed cooling centrifuge (SRX-201 produced by Tomy Seiko Co., Ltd.).

The charge generating efficiency of ink particle was obtained according to the following equation:

Charge generating efficiency of ink particle (%)= (Charge amount of ink particle Q1/Charge amount of ink composition Q2)×100.

The charge stability with the lapse of time was determined in the following manner. The ink composition was put into a polyethylene bottle and allowed to stand under thermal conditions of temperature of 50° C. and humidity of 80% for one week, and then a charge amount of the ink composition Q3 was measure. From the charge amount of the ink composition after allowing to stand Q3 and the charge amount of the ink composition before allowing to stand Q4, a change ratio of charge amount with the lapse of time was obtained according to the following equation:

Change ratio of charge amount with the lapse of time (%)=(Q3/Q4)×100.

EXAMPLE 2

Ink composition EC-2 was prepared in the same manner as in Example 1 except that the coating agent (butyl acrylate/methyl methacrylate (75/25% by weight) copolymer (produced by Sigma-Aldrich Co.)) was changed to Proton-acceptive neutral functional group-containing polymer 2 and that the proton-acceptive neutral functional group-containing compound (imidazole produced by Wako Pure Chemical Industries, Ltd.) was eliminated in the materials used. In the ink composition thus-obtained, the particle diameter of the particle component was 0.98 μm and the content of the particle component having a diameter of 0.2 μm or smaller was 0.5% or less. Using the ink composition, the evaluation of charge and inkjet drawing were performed.

EXAMPLE 3

Ink composition EC-3 was prepared in the same manner as in Example 1 except that the proton-acceptive neutral functional group-containing compound (imidazole produced by Wako Pure Chemical Industries, Ltd.) was changed to polyethyleneimine SP 400 (pKb: 3.3) (produced by Nippon Shokubai Co., Ltd.) in the materials used. In the ink composition thus-obtained, the particle diameter of the particle component was 1.02 μm and the content of the particle component having a diameter of 0.2 μm or smaller was 0.4% or less. Using the ink composition, the evaluation of charge and inkjet drawing were performed.

COMPARATIVE EXAMPLE 1

Ink composition RC-1 was prepared in the same manner as in Example 1 except that the proton-acceptive neutral functional group-containing compound (imidazole produced by Wako Pure Chemical Industries, Ltd.) was eliminated in the materials used in the preparation of Ink composition EC-1 in Example 1. In the ink composition thus-obtained, the particle diameter of the particle component was 0.99 μm and the content of the particle component having a diameter of 0.2 μm or smaller was 0.6% or less. Using the ink composition, the evaluation of charge and inkjet drawing were performed.

The results obtained are shown in Table 1 below.

TABLE 1

| | Charge Amount of Ink Particle (pS/cm) | Charge Generating Efficiency of Ink Particle (%) | Charge Stability with the Lapse of Time[1] | Image Quality of Inkjet Drawing[2] |
|---|---|---|---|---|
| Example 1 | 880 | 95 | A | A |
| Example 2 | 910 | 96 | A | A |
| Example 3 | 840 | 94 | A | A |
| Comparative Example 1 | 510 | 71 | C | B |

[1]Charge stability with the lapse of time
A: Change ratio of charge amount with the lapse of time was 95% or more.
B: Change ratio of charge amount with the lapse of time was from 80% to less than 95%.
C: Change ratio of charge amount with the lapse of time was less than 80%.
[2]Image Quality of Inkjet Drawing The degree of blur in the drawing image was visually evaluated according to the following criteria:
A: No blur occurred.
B: Blur somewhat occurred.
C: Blur definitely occurred.

As is apparent from Examples 1 to 3, due to the incorporation of at least one kind of a proton-acceptive neutral functional group-containing compound into ink particle, the charge generating efficiency of ink particle and charge stability of ink particle with the lapse of time are improved. Thus, an image of good quality free from blur can be obtained according to the inkjet drawing system of the invention because electrophoretic speed of ink particle is so high that concentration of ink particles sufficiently occurs at the ejection part of the inkjet recording device.

Further, the proton-acceptive neutral functional group-containing compound can be mixed with the coating agent as described in Example 1 or can be introduced as the constituting component into the coating agent as described in Example 2.

In Comparison Example 1, which discloses the ink composition wherein the proton-acceptive neutral functional group-containing compound is not used and the coating agent without containing the proton-acceptive neutral functional group-containing compound is used, the charge generating efficiency of ink particle and charge stability of ink particle with the lapse of time are insufficient. Thus, the blur occurred and the image of good quality can not be obtained according to the inkjet drawing system of the invention because electrophoretic speed of ink particle is so low that concentration of ink particles does not sufficiently occur at the ejection part of the inkjet recording device.

EXAMPLES 4 TO 22

Ink compositions EC-4 to EC-22 were prepared in the same manner as in Example 2 except that the coating agent was changed to the compounds shown in Table 2 below in the preparation of Ink composition EC-2 in Example 2, respectively.

TABLE 2

| | Ink Composition | Proton-Acceptive Neutral Functional Group-Containing Polymer |
|---|---|---|
| Example 4 | EC-4 | Proton-acceptive neutral functional group-containing polymer 2 |
| Example 5 | EC-5 | Proton-acceptive neutral functional group-containing polymer 3 |
| Example 6 | EC-6 | Proton-acceptive neutral functional group-containing polymer 4 |
| Example 7 | EC-7 | Proton-acceptive neutral functional group-containing polymer 5 |
| Example 8 | EC-8 | Proton-acceptive neutral functional group-containing polymer 6 |
| Example 9 | EC-9 | Proton-acceptive neutral functional group-containing polymer 7 |
| Example 10 | EC-10 | Proton-acceptive neutral functional group-containing polymer 1/Butyl acrylate/methyl methacrylate (75/25% by weight) copolymer (produced by Sigma-Aldrich Co.) = 50/50% by weight |
| Example 11 | EC-11 | Proton-acceptive neutral functional group-containing polymer 1/Proton-acceptive neutral functional group-containing polymer 2 = 75/25% by weight |
| Example 12 | EC-12 | Proton-acceptive neutral functional group-containing polymer 1/Proton-acceptive neutral functional group-containing polymer 2 = 50/50% by weight |
| Example 13 | EC-13 | Proton-acceptive neutral functional group-containing polymer 1/Proton-acceptive neutral functional group-containing polymer 2 = 25/75% by weight |
| Example 14 | EC-14 | Proton-acceptive neutral functional group-containing polymer 1/Proton-acceptive neutral functional group-containing polymer 3 = 50/50% by weight |
| Example 15 | EC-15 | Proton-acceptive neutral functional group-containing polymer 1/Proton-acceptive neutral functional group-containing polymer 4 = 50/50% by weight |
| Example 16 | EC-16 | Proton-acceptive neutral functional group-containing polymer 3/Proton-acceptive neutral functional group-containing polymer 6 = 50/50% by weight |
| Example 17 | EC-17 | Proton-acceptive neutral functional group-containing polymer 4/Proton-acceptive neutral functional group-containing polymer 7 = 50/50% by weight |
| Example 18 | EC-18 | Proton-acceptive neutral functional group-containing polymer 1/Proton-acceptive neutral functional group-containing polymer 2/Proton-acceptive neutral functional group-containing polymer 3 = 50/25/25% by weight |
| Example 19 | EC-19 | Proton-acceptive neutral functional group-containing polymer 3/Proton-acceptive neutral functional group-containing polymer 4/Proton-acceptive neutral functional group-containing polymer 5 = 50/25/25% by weight |
| Example 20 | EC-20 | Proton-acceptive neutral functional group-containing polymer 4/Proton-acceptive neutral functional group-containing polymer 2/Proton-acceptive neutral functional group-containing polymer 3 = 50/25/25% by weight |
| Example 21 | EC-21 | Proton-acceptive neutral functional group-containing polymer 5/Proton-acceptive neutral functional group-containing polymer 2/Proton-acceptive neutral functional group-containing polymer 3 = 40/30/30% by weight |
| Example 22 | EC-22 | Proton-acceptive neutral functional group-containing polymer 6/Proton-acceptive neutral functional group-containing polymer 4/Proton-acceptive neutral functional group-containing polymer 3 = 40/30/30% by weight |

The evaluations were conducted in the same manner as in Example 1. As a result, it was found that due to the use of the coating agent as in Examples 4 to 22, the charge generating efficiency of ink particle and charge stability of ink particle with the lapse of time were improved, and thus, an image of good quality free from blur could be obtained according to the inkjet drawing system of the invention because electrophoretic speed of ink particle was so high that concentration of ink particles sufficiently occurred at the ejection part of the inkjet recording device.

EXAMPLES 23 TO 40

Ink compositions EC-23 to EC-40 were prepared in the same manner as in Example 1 except that the proton-acceptive neutral functional group-containing compound was changed to the compounds shown in Table 3 below in the preparation of Ink composition EC-1 in Example 1, respectively.

TABLE 3

| | Ink Composition | Proton-Acceptive Neutral Functional Group-Containing Compound | Amount Added (g) | pKb |
|---|---|---|---|---|
| Example 23 | EC-23 | Imidazole (produced by Wako Pure Chemical Industries, Ltd.) | 3 | 7.0 |
| Example 24 | EC-24 | Imidazole (produced by Wako Pure Chemical Industries, Ltd.) | 4 | 7.0 |
| Example 25 | EC-25 | Indole (produced by Wako Pure Chemical Industries, Ltd.) | 2 | 6.4 |
| Example 26 | EC-26 | 1,2,4-Triazole (produced by Sigma-Aldrich Co.) | 2 | 7.5 |
| Example 27 | EC-27 | 2,2':5',2"-Terpyridine (produced by Sigma-Aldrich Co.) | 2 | 6.1 |
| Example 28 | EC-28 | 2,2':5',2"-Terthiophen (produced by Sigma-Aldrich Co.) | 2 | 10.6 |
| Example 29 | EC-29 | 1,4,8,11-Tetraazacyclotetradecane (produced by Sigma-Aldrich Co.) | 2 | 3.4 |
| Example 30 | EC-30 | 1,4,7,10-Tetrathiacyclodecane (produced by Sigma-Aldrich Co.) | 2 | 11.0 |
| Example 31 | EC-31 | Triphenylphophine (produced by Sigma-Aldrich Co.) | 2 | 5.8 |
| Example 32 | EC-32 | Triphenylamine (produced by Sigma-Aldrich Co.) | 2 | 6.1 |

TABLE 3-continued

| Ink Composition | Proton-Acceptive Neutral Functional Group-Containing Compound | Amount Added (g) | pKb |
|---|---|---|---|
| Example 33 | EC-33 | Poly(4-vinyl pyridine) (MW: 60,000) (produced by Sigma-Aldrich Co.) | 2 | 4.9 |
| Example 34 | EC-34 | Polyallylamine (MW: 10,000) (produced by Nitto Boseki Co., Ltd.) | 2 | 3.8 |
| Example 35 | EC-35 | Polyvinylamine (MW: 20,000) (produced by Mitsubishi Chemical Corp.) | 2 | 4.1 |
| Example 36 | EC-36 | Poly(2-vinylpyridine-co-styrene) (MW: 40,000) (produced by Sigma-Aldrich Co.) | 2 | 4.6 |
| Example 37 | EC-37 | Imidazole (produced by Wako Pure Chemical Industries, Ltd.)/Triphenylphophine (produced by Sigma-Aldrich Co.) = 50/50% by weight | 2 | 7.0/5.8 |
| Example 38 | EC-38 | Imidazole (produced by Wako Pure Chemical Industries, Ltd.)/2,2':5',2''-Terthiophen (produced by Sigma-Aldrich Co.) = 50/50% by weight | 2 | 7.0/10.6 |
| Example 39 | EC-39 | Poly(4-vinylpyridine) (produced by Sigma-Aldrich Co.) (MW: 60,000)/Triphenylphophine (produced by Sigma-Aldrich Co.) = 50/50% by weight | 2 | 4.9/5.8 |
| Example 40 | EC-40 | Triphenylamine (produced by Sigma-Aldrich Co.)/Poly(4-vinylpyridine) (produced by Sigma-Aldrich Co.) (MW: 60,000) = 50/50% by weight | 2 | 6.1/4.9 |

The evaluations were conducted in the same manner as in Example 1. As a result, it was found that due to the use of the proton-acceptive neutral functional group-containing compound as in Examples 23 to 40, the charge generating efficiency of ink particle and charge stability of ink particle with the lapse of time were improved, and thus, an image of good quality free from blur could be obtained according to the inkjet drawing system of the invention because electrophoretic speed of ink particle was so high that concentration of ink particles sufficiently occurred at the ejection part of the inkjet recording device.

EXAMPLES 41 TO 58

Ink compositions EC-41 to EC-58 were prepared in the same manner as in Example 1 except that the charge controlling agent was changed to the compounds shown in Table 4 below in the preparation of Ink composition EC-1 in Example 1, respectively.

TABLE 4

| Ink Composition | Charge Controlling Agent Having Proton-Donative Group |
|---|---|
| Example 41 | EC-41 | Stearic acid (pKa: 4.2) |
| Example 42 | EC-42 | 2-Ethylhexanoic acid (pKa: 4.1) |
| Example 43 | EC-43 | Charge controlling agent having proton-donative group (a) |
| Example 44 | EC-44 | Charge controlling agent having proton-donative group (b) |
| Example 45 | EC-45 | Charge controlling agent having proton-donative group (c) |
| Example 46 | EC-46 | Charge controlling agent having proton-donative group (d) |
| Example 47 | EC-47 | Charge controlling agent having proton-donative group (e) |
| Example 48 | EC-48 | Charge controlling agent having proton-donative group (f) |
| Example 49 | EC-49 | Charge controlling agent having proton-donative group (a)/Butyl acrylate/methyl methacrylate (75/25% by weight) copolymer (produced by Sigma-Aldrich Co.) = 50/50% by weight |
| Example 50 | EC-50 | Charge controlling agent having proton-donative group (a)/Charge controlling agent having proton-donative group (d) = 75/25% by weight |
| Example 51 | EC-51 | Charge controlling agent having proton-donative group (a)/Charge controlling agent having proton-donative group (d) = 50/50% by weight |
| Example 52 | EC-52 | Charge controlling agent having proton-donative group (a)/Charge controlling agent having proton-donative group (d) = 25/75% by weight |
| Example 53 | EC-53 | Charge controlling agent having proton-donative group (a)/Charge controlling agent having proton-donative group (e) = 50/50% by weight |
| Example 54 | EC-54 | Charge controlling agent having proton-donative group (b)/Charge controlling agent having proton-donative group (f) = 50/50% by weight |
| Example 55 | EC-55 | Charge controlling agent having proton-donative group (c)/Charge controlling agent having proton-donative group (d) = 50/50% by weight |
| Example 56 | EC-56 | Charge controlling agent having proton-donative group (e)/Stearic acid (pKa: 4.2) = 50/50% by weight |
| Example 57 | EC-57 | CT-1/Charge controlling agent having proton-donative group (d)/Stearic acid (pKa: 4.2) = 50/25/25% by weight |
| Example 58 | EC-58 | CT-1/Charge controlling agent having proton-donative group (a)/Charge controlling agent having proton-donative group (e) = 50/25/25% by weight |

The evaluations were conducted in the same manner as in Example 1. As a result, it was found that due to the use of the charge controlling agent as in Examples 41 to 58, the charge generating efficiency of ink particle and charge stability of ink particle with the lapse of time were improved, and thus, an image of good quality free from blur could be obtained according to the inkjet drawing system of the invention because electrophoretic speed of ink particle was so high that concentration of ink particles sufficiently occurred at the ejection part of the inkjet recording device.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. An ink composition comprising a dispersion medium and a charged particle, wherein the charged particle comprises a colorant, a compound having pKb of 16 or less in water and containing a proton-acceptive neutral functional group, and a charge controlling agent having pKa of 16 or less in water and containing a proton-donative group.

2. The ink composition as claimed in claim 1, wherein the proton-acceptive neutral functional group is a functional group containing one or more atoms selected from a nitrogen atom, an oxygen atom, a sulfur atom and a phosphorus atom.

3. The ink composition as claimed in claim 1, wherein the charged particles contain a coating agent.

4. The ink composition as claimed in claim 3, wherein the compound having pKb of 16 or less in water and containing a proton-acceptive neutral functional group is used as a constituting component of the coating agent.

5. The ink composition as claimed in claim 1, wherein an amount of the proton-acceptive neutral functional group is from 1 to 40% by weight based on the charged particles.

6. The ink composition as claimed in claim 1, wherein the charge controlling agent having pKa of 16 or less in water and containing a proton-donative group has a carboxy group, a hydroxy group, a phosphono group, a sulfo group, a thiol group, an imido group or a sulfonamido group.

7. An inkjet recording method comprising a step of flying an ink composition as ink droplets by utilizing an electrostatic field, wherein the ink composition comprises a dispersion medium and a charged particle comprising a colorant, a compound having pKb of 16 or less in water and containing a proton-acceptive neutral functional group, and a charge controlling agent having pKa of 16 or less in water and containing a proton-donative group.

* * * * *